(12) United States Patent
Flouros et al.

(10) Patent No.: US 10,329,952 B2
(45) Date of Patent: Jun. 25, 2019

(54) BEARING ASSEMBLY, IN PARTICULAR FOR A TURBOMACHINE, AND TURBOMACHINE HAVING SUCH A BEARING ASSEMBLY

(71) Applicants: MTU Aero Engines AG, Munich (DE); Schaeffler Technologies AG & Co. KG, Herzogenaurach (DE)

(72) Inventors: Michael Flouros, Munich (DE); Peter Gloeckner, Schweinfurt (DE); Patrick Mirring, Schwebheim (DE); Matthias Martin, Wuerzburg (DE)

(73) Assignees: MTU Aero Engines AG, Munich (DE); Schaeffler Technologies AG & Co. KG, Herzogenaurach (DE)

( * ) Notice: Subject to any disclaimer, the term of this patent is extended or adjusted under 35 U.S.C. 154(b) by 18 days.

(21) Appl. No.: 15/661,162

(22) Filed: Jul. 27, 2017

(65) Prior Publication Data
US 2018/0030854 A1  Feb. 1, 2018

(30) Foreign Application Priority Data
Jul. 29, 2016  (DE) .................. 10 2016 214 018

(51) Int. Cl.
*F16C 33/58* (2006.01)
*F01D 25/16* (2006.01)
(Continued)

(52) U.S. Cl.
CPC ........... *F01D 25/16* (2013.01); *F01D 25/125* (2013.01); *F01D 25/186* (2013.01); *F16C 27/045* (2013.01); *F16C 33/303* (2013.01); *F16C 33/583* (2013.01); *F16C 33/64* (2013.01); *F16C 33/6651* (2013.01); *F16C 33/6659* (2013.01); *F16C 33/76* (2013.01); *F16C 35/077* (2013.01); *F16C 37/007* (2013.01); *F16C 19/06* (2013.01); *F16C 19/22* (2013.01)

(58) Field of Classification Search
CPC ........................... F16C 27/045; F16C 33/6677
See application file for complete search history.

(56) References Cited

U.S. PATENT DOCUMENTS 7,874,733 B2  1/2011  Kobayashi et al.
7,950,857 B2  5/2011  Glueck
(Continued)

FOREIGN PATENT DOCUMENTS

DE         10322631    12/2004
DE       102005058141    7/2007
(Continued)

*Primary Examiner* — Thomas R Hannon
(74) *Attorney, Agent, or Firm* — Davidson, Davidson & Kappel, LLC

(57) ABSTRACT

A bearing assembly (2) is provided, in particular for a turbomachine, including: an inner bearing race (3); an outer bearing race (4) having at least one cooling channel (15) formed within it or in its outer surface; rolling elements (7) made of ceramic and disposed between the inner bearing race (3) and the outer bearing race (4); and a surrounding bearing ring (9) connected to the outer bearing race (4) and configured to form a squeeze film (10) of oil between its outer surface and an opposite inner surface of a housing (1) in which the bearing assembly can be mounted.

30 Claims, 1 Drawing Sheet

(51) Int. Cl.
  F01D 25/12 (2006.01)
  F01D 25/18 (2006.01)
  F16C 33/64 (2006.01)
  F16C 33/66 (2006.01)
  F16C 33/76 (2006.01)
  F16C 35/077 (2006.01)
  F16C 27/04 (2006.01)
  F16C 33/30 (2006.01)
  F16C 37/00 (2006.01)
  F16C 19/22 (2006.01)
  F16C 19/06 (2006.01)

(56) References Cited

U.S. PATENT DOCUMENTS

| | | | |
|---|---|---|---|
| 8,210,751 B2 | 7/2012 | Streit et al. | |
| 9,068,593 B2 | 6/2015 | Gloeckner et al. | |
| 9,234,548 B2 | 1/2016 | Frank | |
| 9,366,295 B2 | 6/2016 | Sebald et al. | |
| 9,841,056 B2* | 12/2017 | Snow | F01D 25/162 |
| 2005/0259903 A1* | 11/2005 | Takizawa | F16C 19/525 |
| | | | 384/448 |
| 2011/0142386 A1 | 6/2011 | Flouros | |
| 2012/0037278 A1 | 2/2012 | Beer et al. | |
| 2013/0084035 A1 | 4/2013 | Williams et al. | |

FOREIGN PATENT DOCUMENTS

| | | |
|---|---|---|
| DE | 102006024603 | 11/2007 |
| DE | 112006003601 | 11/2008 |
| DE | 102008036196 | 2/2010 |
| DE | 102010049953 | 4/2012 |
| DE | 10 2012 203 933 | 9/2013 |
| DE | 102014216313 | 2/2016 |
| EP | 2 304 259 | 1/2014 |
| FR | 2965858 | 4/2012 |
| JP | 2015183697 | 10/2015 |
| JP | 201540608 | 9/2016 |
| WO | WO 2011/067154 | 6/2011 |

* cited by examiner

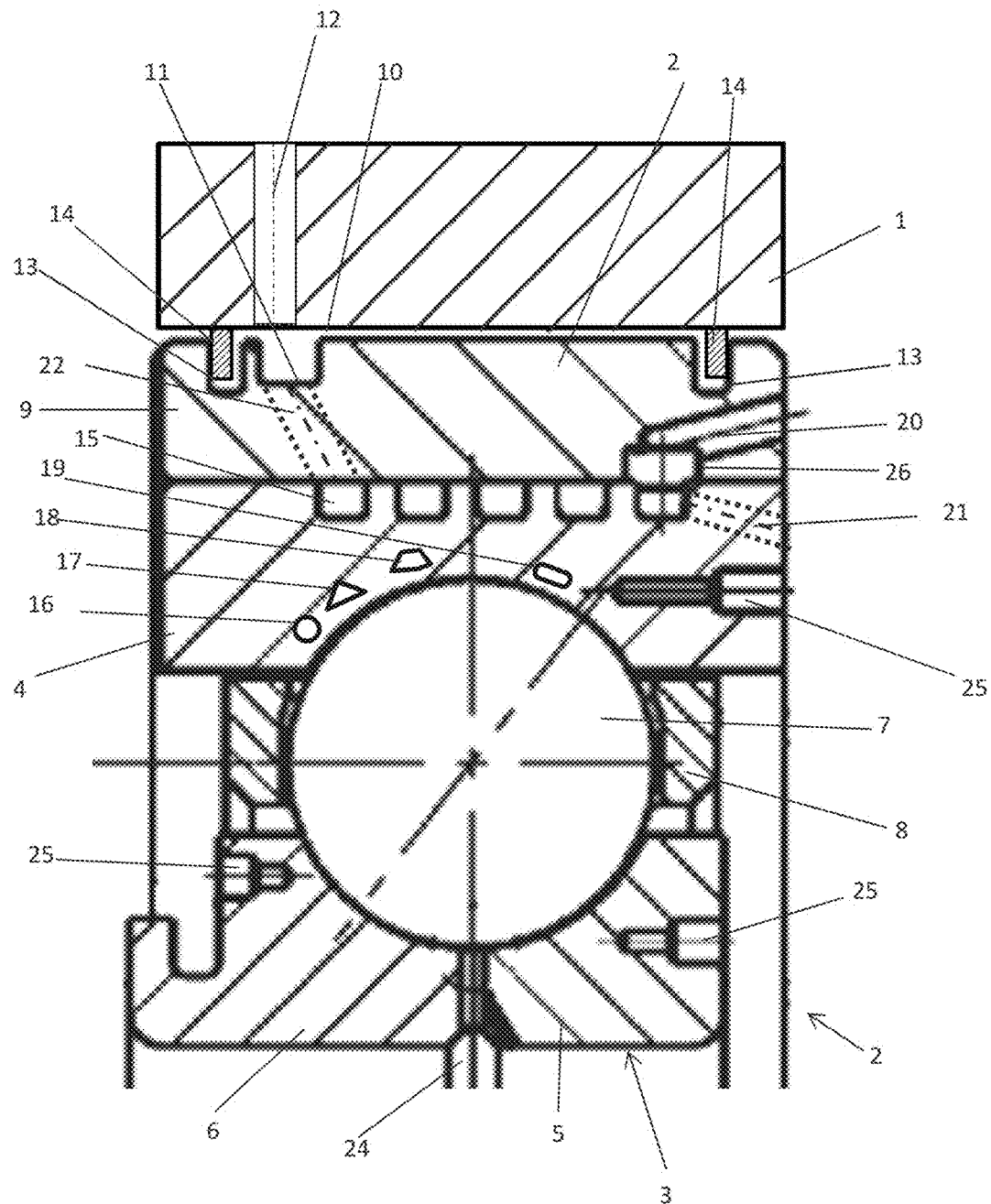

BEARING ASSEMBLY, IN PARTICULAR FOR A TURBOMACHINE, AND TURBOMACHINE HAVING SUCH A BEARING ASSEMBLY

The present invention relates to a bearing assembly, in particular for a turbomachine, and a turbomachine having such a bearing assembly.

BACKGROUND

Heretofore, cooling of engine main shaft bearings has been done by lateral injection of oil or, utilizing centrifugal force, by means of cooling oil supplied below the shaft to be supported. The known outer-race cooling through a cooling channel in the outer race of the bearing cools the outer bearing race directly and contributes to a partial decoupling of the lubrication and cooling of bearings. Also known is a direct outer-race cooling which, in accordance with publication EP 2 304 259, takes place in the rigid bearing seat without additional squeeze film damping or, as described in publication WO 2011/067154, in a squeeze-film-damped seat with combined outer-race cooling and squeeze film damping. The combination of direct outer-race cooling and squeeze film damping can be accomplished with a stationary outer race or a rotating outer race, as described in publication DE 10 2012 203 933.

In addition, there are known rolling-element bearings with both a steel contact partner and a ceramic contact partner, where the steel contact partner has selectively introduced residual compressive stresses, as described in US 2012/0037278 A1.

The fatigue strength of the heretofore used heat-resistant steels decreases with increasing temperature. Furthermore, the oils used for lubrication and heat dissipation are limited in operating temperature, and thus, with the currently used bearing materials and oils, the temperature in the contact region cannot be significantly increased. The primary disadvantage is that the load on the outer race contacts is decisively negatively affected by the centrifugal forces of the steel rolling elements. With the heretofore used steel rolling elements, the centrifugal force is very high, especially at high rotational speeds, and requires higher cooling oil flow rates, which, in turn, are associated with increased bearing power losses and a larger-dimensioned oil system architecture, such as pumps, supply and discharge lines, seals, etc.

SUMMARY OF THE INVENTION

It is an object of the present invention is to provide an improved bearing assembly and an improved turbomachine.

Accordingly, there is provided a bearing assembly, in particular for a turbomachine, including:
an inner bearing race;
an outer bearing race disposed opposite the inner bearing race and having at least one cooling channel;
rolling elements made of ceramic and disposed between the inner bearing race and the outer bearing race; and
a surrounding bearing ring connected to the outer bearing race and configured to form a squeeze film of oil between its outer surface and an opposite inner surface of a housing in which the bearing assembly can be mounted.

Due to the rolling elements made of ceramic, it is possible, on the one hand, to reduce bearing and rolling contact loading and, on the other hand, to achieve effective dissipation of heat from the contact region as well as damping by providing squeeze film damping in connection with providing at least one cooling channel in the outer bearing race.

In an embodiment of the present invention, the inner bearing race and/or the outer bearing race are/is provided with residual compressive stress. The residual compressive stress in the inner bearing race and/or the outer bearing race may be induced, for example, by a nitriding process and optionally additionally by a heat treatment in the inner bearing race and/or the outer bearing race. A residual compressive stress selectively introduced in the respective bearing race in this manner has the advantage of counteracting progressive cracking of the bearing race.

In another embodiment of the present invention, the at least one cooling channel is formed within the outer bearing race or in the outer surface of the outer bearing race. The at least one cooling channel may be formed in the outer surface of the outer bearing race using, for example, a mechanical machining process. Furthermore, the at least one cooling channel within the outer bearing race may, in turn, be formed using an additive manufacturing process, in particular laser melting or laser sintering. By using an additive manufacturing process, it is possible to easily form cooling channels having a defined complex cross section or cross-sectional variation in the longitudinal direction of the cooling channel. A mechanical machining process, such as, for example, turning, is particularly suited for forming a helically extending cooling channel in the outer surface of the outer bearing race.

In accordance with an embodiment of the present invention, the cooling channel is circular, triangular, semicircular, slot-shaped, oval and/or polygonal in cross section. The dimensions and/or the shape of the cross section of the cooling channel may be constant or vary along the length of the cooling channel, depending on its function and purpose.

In an embodiment of the present invention, the surrounding bearing ring has at least one oil distribution groove in its outer surface. The oil groove has the advantage of being able to receive and intermediately store oil.

Further, in another embodiment of the present invention, a seal may be provided on the outer surface of the surrounding bearing ring in order to seal the two ends of the squeeze film. To this end, the surrounding bearing ring may, for example, be provided on its outer surface with a receiving recess and a sealing element received therein at both ends of the to-be-formed squeeze film in order to seal the squeeze film. In this manner, the oil for the squeeze film can be prevented from unintentionally flowing out at the sides.

In a further embodiment of the present invention, the surrounding bearing ring is provided at one side with a coolant feed duct which is coupled to the at least one cooling channel of the outer bearing race for supplying coolant, in particular for supplying the coolant through a coolant nozzle. The coolant used may be oil, for example. Via the coolant duct, coolant such as oil, for example, can very easily be supplied to the cooling channel laterally from the outside through the coolant feed duct in the outer bearing race.

In accordance with an embodiment of the present invention, the surrounding bearing ring has a coolant supply passage extending from its outer surface to the at least one cooling channel of the outer bearing race, or to a connecting channel of the outer bearing race to the at least one cooling channel, in order to supply oil of the squeeze film to the cooling channel. The coolant supply passage at the outer surface of the outer bearing race can be very easily coupled to an oil supply duct of the housing, thereby saving costs.

In an embodiment of the present invention, the outer bearing race has a coolant drain duct which is connected to the at least one cooling channel for draining coolant from the cooling channel to the exterior. In this way, coolant which is no longer needed or used up can be easily removed from the bearing assembly to the exterior.

In a further embodiment of the present invention, the inner bearing race has at least one coolant supply duct. In the case of a split bearing race, the coolant supply duct may be provided between the two bearing race halves.

In another embodiment of the present invention, the inner bearing race and/or the outer bearing race have/has at least one receptacle for receiving a sensor, for example, a thermocouple. The thermocouple makes it possible to determine the temperature of the respective bearing race and, for example, to control the cooling of the bearing race in open and/or closed loop.

In accordance with an embodiment of the present invention, the surrounding bearing ring and the outer bearing race are interlockingly and/or frictionally connected together. For example, they may be joined by an interference fit, a threaded connection, a welded connection, interlocking teeth and/or a keyed connection, which eliminates the need for the surrounding bearing ring to be centered and flange-mounted to a housing of a turbomachine.

In another embodiment of the present invention, the outer bearing race has at least one spring bar for flange-mounting the outer bearing race to and centering it on the housing to which the bearing assembly can be attached.

In an embodiment of the present invention, the turbomachine has a housing in which the bearing assembly can be disposed for supporting a shaft of the turbomachine. The turbomachine is, for example, an aircraft engine or a gas turbine, for example a stationary gas turbine.

BRIEF DESCRIPTION OF THE DRAWING

Other features and advantages of the present invention are described below with reference to the FIGURE.

FIG. 1 shows a cross section through a portion of a housing and a bearing assembly in accordance with an embodiment of the present invention.

DETAILED DESCRIPTION

FIG. 1 shows a cross section through a portion of a housing 1 and a bearing assembly 2 according to an embodiment of the present invention. The inventive bearing assembly 2 is shown installed in a housing 1.

In the inventive bearing assembly 2, which will be described in detail below with reference to FIG. 1, bearing and rolling contact loading can be reduced by using ceramic rolling elements 7. Moreover, squeeze film damping can be provided in connection with effective dissipation of heat from the contact region by means of at least one cooling channel provided in the outer bearing race and preferably an additional cooling channel which has a special cross-sectional shape and is shaped to conform to the shape of the raceway. In addition, the bearing races made of steel can be provided with raceways of increased performance by introducing a selectively introduced residual compressive stress profile, which, in turn, results in increased resistance to rolling wear and reduced loading. Further, the inventive bearing assembly also makes it possible to achieve higher speeds or RPM.

Thus, the inventive bearing assembly 2 makes it possible to reduce power losses and temperatures, to increase the service life and resistance to rolling wear, and to reduce the required quantity of oil and the bearing and system weight while at the same time enabling increased speed or RPM.

The bearing assembly 2 embodied according to the present invention and shown in FIG. 1 has an inner bearing race 3 and an outer bearing race 4. In the exemplary embodiment shown in FIG. 1, inner bearing race 3 is, for example, formed in two pieces and has two inner bearing race halves 5, 6. However, inner bearing race 3 may also be formed as a single piece.

The rolling elements 7 of the bearing assembly are received between inner bearing race 3 and outer bearing race 4 and may additionally be guided, for example within an optional cage 8.

Rolling elements 7 are in this case made of ceramic, in particular of a high-performance ceramic material, such as, for example, $Si_3N_4$. The rolling elements 7 made of ceramic have the advantage over conventional steel rolling elements that they dissipate less power.

In the exemplary embodiment shown in FIG. 1, for example, balls are provided as rolling elements 7. Besides balls, it is also possible to use cylinders, needles, barrel-shaped rollers or cone-shaped rollers, etc., as rolling elements. However, the bearing assembly according to the present invention is not limited to the examples mentioned for rolling elements 7.

Bearing assembly 2 further has a surrounding bearing ring 9, which is connected to outer bearing race 4. The connection between surrounding bearing ring 9 and outer bearing race 4 is created by an interlocking and/or frictional connection, such as, for example, an interference fit, a threaded connection, a welded connection, interlocking teeth and/or a keyed connection, etc. However, the present invention is not limited to the mentioned examples of interlocking and/or frictional connections. The inventive bearing assembly 2 has the advantage that outer bearing race 4 does not necessarily have to be flange-mounted to an associated housing in centered relationship thereto via additional, so-called spring bars, as in the prior art, but rather can be connected freely; i.e., without being centered, to the surrounding bearing ring 9 required for squeeze film damping, as illustrated in the exemplary embodiment in FIG. 1.

In this connection, a squeeze film 10 of oil or lubricating oil for damping bearing assembly 2 is formed between the outer surface of surrounding bearing ring 9 and the opposite inner surface of housing 1. In the exemplary embodiment shown in FIG. 1, surrounding bearing ring 9 has an optional additional oil distribution groove 11 in its outer surface.

Oil distribution groove 11 may be coupled or connected, for example, to an oil supply duct 12 of housing 1, as shown in the exemplary embodiment in FIG. 1. Thus, oil can be introduced between the outer surface of surrounding bearing ring 9 and the inner surface of housing 1 via housing 1 and its oil supply duct 12, and in particular can be supplied to oil distribution groove 11 in order to form squeeze film 10.

In this connection, as shown in FIG. 1, an additional, lateral seal is provided between housing 1 and surrounding bearing ring 9 to prevent the oil of squeeze film 10 from unintentionally escaping laterally from the gap between the inner surface of housing 1 and the outer surface of surrounding bearing ring 9. To this end, in the exemplary embodiment in FIG. 1, receiving recesses 13, for example in the form of grooves, are provided in the outer surface of surrounding bearing ring 9, which each receive a sealing element 14, such as a piston ring, for laterally sealing the squeeze film 10 formed of the supplied oil. Additionally or alternatively, such receiving recesses 13 and respective sealing elements 14 to be received therein may also be provided at the inner surface of housing 1.

Due to the self-centering action of the inventive bearing assembly 2, the squeeze film damper or squeeze film damping of bearing assembly 2 has no static stiffness. The dynamic stiffness does not develop until a shaft supported by bearing assembly 2 reaches a certain rotational speed. Thus, the bearing assembly 2 according to the present invention provides a reduction in weight, axial space, and assembly effort as compared to a conventional, centered design.

Outer bearing race 4 has at least one cooling channel 15. In the exemplary embodiment shown in FIG. 1, for example, a helical cooling channel 15 is provided in the outer surface of outer bearing race 4. Instead of helical cooling channel 15, it is also possible to provide a plurality of annular channels in the outer surface of outer bearing race 4, which may optionally additionally be interconnected, for example via connecting channels.

Cooling channel 15 may, for example, be formed as a recess, such as a groove, in the outer surface of outer bearing race 4, as illustrated in FIG. 1. To this end, cooling channel 15 may, for example, be formed in the outer surface of outer bearing race 4 using a mechanical machining process, such as, for example, turning, or another suitable manufacturing process, or a combination of manufacturing processes. It is also possible that one or more cooling channels 15 may be formed within outer bearing race 4 at least partly or completely therearound, for example by laser sintering, laser melting, or another suitable additive manufacturing process. As illustrated by way of example in FIG. 1, such cooling channels 15 may, for example, have a circular cross section 16, a triangular cross section 17, a multi-angular or polygonal cross section 18, a semicircular cross section, a cross section in the shape of an annular sector, or a cross section in the shape of a slot 19. The cross section of cooling channel 15 may, in addition, be adapted to conform to the contour of the inner surface of outer bearing race 4 and may, for example, extend along at least a portion of the contour. A cross section in the shape of a slot may, for example, extend in a curved manner along the contour of the inner surface of outer bearing race 4. However, the present invention is not limited to the examples mentioned for the cross-sectional shape of cooling channel 15. Furthermore, the dimensions and/or the shape of the cross section of cooling channel 15 may be constant (i.e., uniform) or alternatively vary in the longitudinal direction of cooling channel 15, depending on its function and purpose.

In the exemplary embodiment of the inventive bearing assembly shown in FIG. 1, coolant, such as oil, is supplied to cooling channel 15 of outer bearing race 4 through a coolant feed duct 20, such as a coolant bore, for example, via a coolant distribution groove 26.

Similarly, in the case of a cooling channel 15 provided within outer bearing race 4, a corresponding coolant feed duct may be provided for supplying the coolant to cooling channel 15. Such coolant feed ducts may be formed by drilling or, like the respective cooling channel 15 within outer bearing race 4, using an additive manufacturing process, such as laser sintering or laser melting, etc. Optionally additionally, an additional coolant drain duct 21 may be provided in outer bearing race 4, such as, for example, a bore for removing the coolant from cooling channel 15 after cooling of cooling channel 15. Such bores may be formed, for example, by drilling or using an additive manufacturing process such as, for example, laser melting or laser sintering, etc.

The cooling of outer bearing race 4 by providing outer bearing race 4 with at least one cooling channel 15 allows the energy dissipated in the rolling contacts to be very effectively removed. Furthermore, the use of rolling elements 7 of ceramic makes it possible to reduce centrifugal loading as well as the power losses occurring in the rolling contact.

In a further embodiment of the present invention, as indicated by a dotted line in FIG. 1, surrounding bearing ring 9 may be provided with a coolant supply passage 22, such as a coolant supply bore, via which oil of the squeeze film 10 between the inner surface of housing 1 and the outer surface of surrounding bearing ring 9 is supplied to cooling channel 15 of outer bearing race 4. In the exemplary embodiment shown in FIG. 1, coolant supply passage 22 of surrounding bearing ring 9 extends from oil distribution groove 11 in the outer surface of surrounding bearing ring 9 to cooling channel 15 in the outer surface of outer bearing race 4. Here too, the used-up coolant, in this case oil, may be drained via coolant drain duct 21.

In the case of a cooling channel 15 present within outer bearing race 4, outer bearing race 4 is provided with a corresponding feed duct (not shown) connecting coolant supply passage 22 of surrounding bearing ring 9 to cooling channel 15 of outer bearing race 4.

Moreover, outer bearing race 4 is provided with a coolant drain duct 21 (also indicated by a dotted line in FIG. 1), via which the damper oil of squeeze film 10 can subsequently be removed. To this end, in the exemplary embodiment shown in FIG. 1, coolant drain duct 21 extends from cooling channel 15 of outer bearing race 4, for example, to a side of outer bearing race 4 to remove the damper oil of squeeze film 10, This embodiment of bearing assembly 2 has the advantage that the damper oil of squeeze film 10 can be used for direct cooling of the outer bearing race. To this end, as previously described, outer bearing race 4 merely has provided therein a coolant supply passage 22 from squeeze film 10, which functions as damper oil film, to cooling channel 15 of outer bearing race 4, as well as a removing of this oil from outer bearing race 4 via a coolant drain duct 21. In this embodiment of the inventive bearing assembly 2, the previously described coolant feed duct 20 in outer bearing race 4 can be dispensed with because the oil for squeeze film 10 is additionally used as the coolant for cooling channel 15.

As shown in the exemplary embodiment in FIG. 1, for example, at least one additional coolant supply duct 24 is provided in inner bearing race 3 to supply coolant, such as oil, to the lateral surfaces of inner bearing race halves 5, 6 of split inner bearing race 3. In this connection, a quantity of so-called "under-race" oil is supplied, as a quantity of coolant, to inner bearing race 3 through a so-called "split line." However, as previously described, the present invention is not limited to a split inner bearing race 3. Inner bearing race 3 may also be formed as a single piece and optionally additionally provided with the at least one coolant supply duct 24.

In another embodiment of the inventive bearing assembly 2, a receptacle 25, or, as in the exemplary embodiment in FIG. 1, a plurality of receptacles 25, such as bores, may optionally additionally be provided for receiving a respective thermocouple (not shown). Such a thermocouple can be used to determine and monitor the temperature of bearing assembly 2.

In the bearing assembly 2 according to the present invention, in addition and preferably, residual compressive stresses are selectively introduced in outer bearing race 4 and/or inner bearing race 3, which, for example, are made of steel. Such residual compressive stresses in the outer and/or inner bearing races have the advantage of making it possible to counteract progressive damage, for example, which may be caused, for example, by cracks in the component. Such residual compressive stresses may be introduced into outer bearing race 4 and/or inner bearing race 3, for example, by a nitriding process and optionally additionally by a heat treatment. This increases the hardness and strength of outer bearing race 4 and/or inner bearing race 3.

In the inventive bearing assembly 2, both the squeeze film damping at the outer diameter of surrounding bearing ring 9, cooling channel 15 on outer bearing race 4, as well as the lubricating cooling supply can be supplied via a shaft supported by bearing assembly 2 with in each case one oil supply passage 20, 22 intended for this purpose. In this connection, the oil can serve as a coolant and lubricant.

As previously described, it is generally possible that the oil used for squeeze film damping can, at the same time, be also used for cooling the outer bearing race. By directly cooling outer bearing race 4, the temperature of the outer bearing race decreased significantly and the loading in the rolling contact is reduced. At the same time, a reduced material temperature of outer bearing race 4 means increased resistance to classic rolling-contact fatigue and surface fatigue. In contrast to the so-called "under-race" cooling via the small lateral surfaces of inner bearing race, a separation between lubrication and cooling is achieved for outer bearing race 4. The quantity of oil supplied for lubrication and cooling via the additional coolant supply duct 24 in inner bearing race 3 can thus be significantly reduced. As a result, the churning and splashing losses of bearing assembly 2 are reduced. The lower bearing temperature and the smaller quantity of oil required also mean a reduced oil weight, which not only allows for a smaller oil reservoir, but also for a smaller dimensioned oil/air and oil/fuel cooler. Moreover, in cases where smaller oil quantities are required, it is possible to use smaller, more efficient oil pumps. That is, the entire oil system architecture benefits from the use of the inventive bearing assembly 2 with regard to power and weight savings and increases in efficiency.

The inventive bearing assembly described hereinbefore by way of example can be used as a rolling-element bearing assembly in particular in thermally and mechanically highly loaded applications, such as in aircraft engines and stationary gas turbines, for example as main shaft bearings of aircraft engines or stationary gas turbines. However, the present invention is not limited to the applications mentioned.

Although the present invention has been completely described above with reference to preferred exemplary embodiments, it is not limited thereto, but may be modified in many ways. In particular, the exemplary embodiments described above with reference to FIG. 1, especially individual features thereof, may be combined with one another.

LIST OF REFERENCE NUMERALS

1 housing
2 bearing assembly
3 inner bearing race
4 outer bearing race
5 first inner bearing race half
6 second inner bearing race half
7 rolling element
8 cage
9 surrounding bearing ring
10 squeeze film
11 oil distribution groove
12 oil supply duct (housing)
13 receiving recess
14 sealing element
15 cooling channel
16 circular cross section
17 triangular cross section
18 polygonal cross section
19 cross section in the shape of a slot
20 coolant feed duct (outer bearing race)
21 coolant drain duct (outer bearing race)
22 coolant supply passage
24 coolant supply duct (inner bearing race)
25 receptacle for thermocouple
26 coolant distribution groove

What is claimed is:

1. A bearing assembly comprising:
an inner bearing race;
an outer bearing race disposed opposite the inner bearing race and having at least one cooling channel;
rolling elements made of ceramic and disposed between the inner bearing race and the outer bearing race; and
a surrounding bearing ring connected to the outer bearing race and configured to form a squeeze film of oil between an outer surface of the bearing ring and an opposite inner surface of a housing in which the bearing assembly can be mounted.

2. The bearing assembly as recited in claim 1 wherein the inner bearing race or the outer bearing race is provided with residual compressive stress, the residual compressive stress being induced in the inner bearing race or the outer bearing race.

3. The bearing assembly as recited in claim 2 wherein the residual compressive stress is induced by a nitriding process.

4. The bearing assembly as recited in claim 3 wherein the residual compressive stress is further induced by an additional heat treatment.

5. The bearing assembly as recited in claim 1 wherein the at least one cooling channel is formed within the outer bearing race or in a bearing race outer surface of the outer bearing race.

6. The bearing assembly as recited in claim 5 wherein the at least one cooling channel in the bearing race outer surface of the outer bearing race is formed using a mechanical machining process, or the at least one cooling channel within the outer bearing race is formed using an additive manufacturing process.

7. The bearing assembly as recited in claim 6 wherein the at least one cooling channel is formed within the outer bearing race using laser melting or laser sintering.

8. The bearing assembly as recited in claim 1 wherein the cooling channel is circular, triangular, semicircular, slot-shaped, oval or polygonal in cross section; the dimensions or shape of the cross section of the cooling channel is constant or varying along the length of the cooling channel.

9. The bearing assembly as recited in claim 1 wherein the bearing ring has at least one oil distribution groove in the outer surface.

10. The bearing assembly as recited in claim 1 wherein a seal is provided on the outer surface of the bearing ring in order to seal the two ends of the squeeze film; the bearing ring being provided on the outer surface with a receiving recess and a sealing element received therein.

11. The bearing assembly as recited in claim 10 wherein the sealing element is located at both ends of the squeeze film in order to seal the squeeze film.

12. The bearing assembly as recited in claim 1 wherein the bearing ring is provided at one side with a coolant feed duct coupled to the at least one cooling channel of the outer bearing race for supplying coolant.

13. The bearing assembly as recited in claim 1 wherein the coolant feed duct supplies the coolant through a coolant distribution groove; with oil being used as the coolant.

14. The bearing assembly as recited in claim 1 wherein the bearing ring has a coolant supply passage for supplying oil of the squeeze film to the cooling channel; the coolant supply passage extending from the outer surface of the bearing ring to the at least one cooling channel of the outer bearing race, or to a connecting channel of the outer bearing race to the at least one cooling channel.

15. The bearing assembly as recited in claim 1 wherein the outer bearing race has a coolant drain duct connected to the at least one cooling channel for draining coolant from the cooling channel to the exterior.

16. The bearing assembly as recited in claim 1 wherein the inner bearing race has at least one coolant supply duct.

17. The bearing assembly as recited in claim 16 wherein the inner bearing race is made in one piece or in two pieces.

18. The bearing assembly as recited in claim 1 wherein the inner bearing race or the outer bearing race has at least one receptacle for receiving a sensor.

19. The bearing assembly as recited in claim 18 wherein the sensor is a thermocouple.

20. The bearing assembly as recited in claim 1 wherein the bearing ring and outer bearing race are joined by an interlocking or frictional connection.

21. The bearing assembly as recited in claim 1 wherein the bearing ring and outer bearing race are joined by an interference fit, a threaded connection, a welded connection, interlocking teeth or a keyed connection.

22. A turbomachine comprising the bearing assembly as recited in claim 1.

23. The turbomachine as recited in claim 22 further comprising a housing, the bearing assembly disposable in the housing for supporting a shaft of the turbomachine.

24. An aircraft engine or a gas turbine comprising the turbomachine as recited in claim 23.

25. A stationary gas turbine comprising the turbomachine as recited in claim 23.

26. The bearing assembly as recited in claim 1 wherein the squeeze film is sealed laterally between the housing and the bearing ring to prevent the oil from escaping laterally.

27. The bearing assembly as recited in claim 1 further comprising lateral seals between the bearing ring and the housing and sealing the squeeze film of oil laterally.

28. The bearing assembly as recited in claim 1 wherein the inner bearing race has a coolant supply duct.

29. The bearing assembly as recited in claim 1 further comprising a cage between the inner race and the outer race.

30. The bearing assembly as recited in claim 1 wherein the inner race has a groove, the rolling elements running in the groove.

* * * * *